United States Patent

[11] 3,578,865

| [72] | Inventor | Alfred E. Traver |
| | | Great Neck, N.Y. |
| [21] | Appl. No. | 764,706 |
| [22] | Filed | Oct. 3, 1968 |
| [45] | Patented | May 18, 1971 |
| [73] | Assignee | Mobil Oil Corporation |

[54] METHOD AND APPARATUS FOR PHOTO-ELECTRICALLY MONITORING THE DEGRADATION OF AN OIL STREAM
2 Claims, 5 Drawing Figs.

[52] U.S. Cl. .................................................. 356/70, 356/205, 356/246, 250/218
[51] Int. Cl. ............................................. G01n 1/10, G01n 21/22, G01n 33/28
[50] Field of Search ............................... 356/70, 201, 205, 246, 96; 250/218, 210

[56] References Cited
UNITED STATES PATENTS

| 2,024,720 | 12/1935 | Cornell et al. | 250/218 |
| 2,068,476 | 1/1937 | Thomas | 356/70 |
| 2,082,252 | 6/1937 | McDill | 250/218X |
| 2,402,394 | 6/1946 | Guerra | 250/218X |
| 2,501,599 | 3/1950 | Eltenton et al. | 356/70X |
| 2,889,736 | 6/1959 | Borg | 356/70 |
| 2,912,895 | 11/1959 | Hamilton | 356/96 |
| 3,045,125 | 7/1962 | Mason | 250/210X |
| 3,225,645 | 12/1965 | Baruch et al. | 250/218X |
| 3,347,132 | 10/1967 | Conlisk | 356/246 |
| 1,810,172 | 6/1931 | Hayes | 250/210X |

*Primary Examiner*—James W. Lawrence
*Assistant Examiner*—T. N. Grigsby
*Attorneys*—Oswald G. Hayes, Andrew L. Gaboriault and James F. Powers, Jr.

ABSTRACT: A device for monitoring the degradation of an engine oil stream. The device includes a pair of serially connected photocells which form one side of a bridge circuit. One of the photocells senses the amount of light transmission through a diverted portion of the flowing oil stream. The other of the photocells is located in close proximity to the first photocell to compensate for changes in ambient temperature. The amount of light transmission through the diverted portion of the oil stream is indicative of the degradation of the oil and is reflected by unbalancing the bridge circuit. The amount of unbalance of the bridge circuit is either indicated on a meter or recorded.

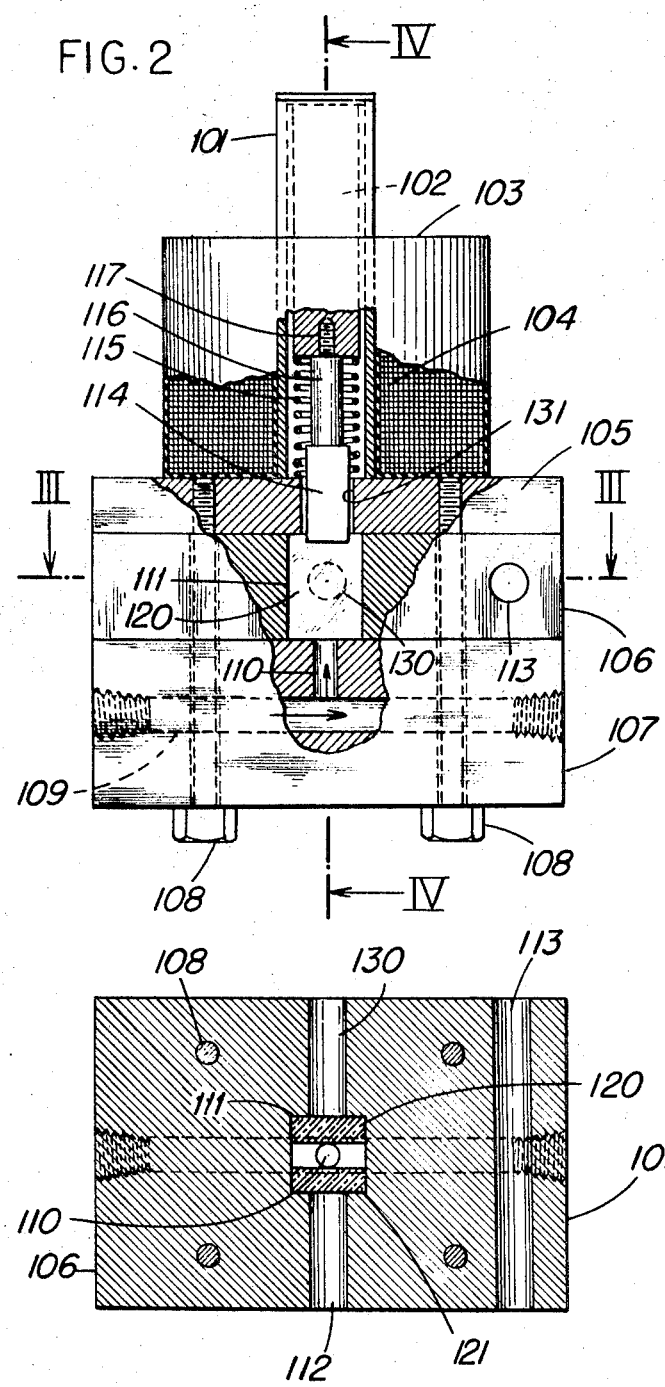
FIG. 2
FIG. 3
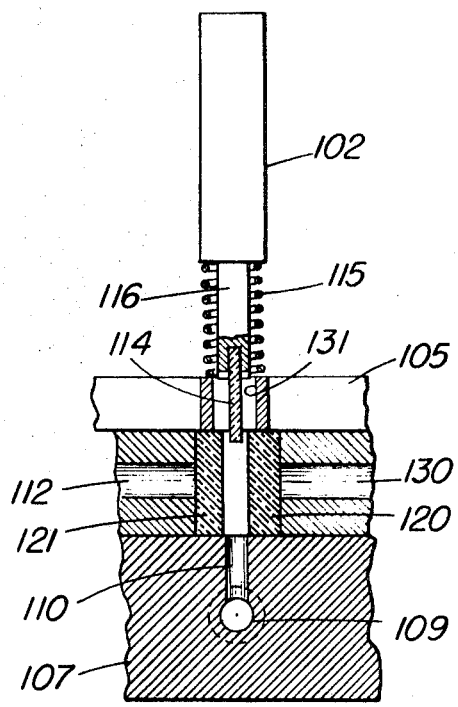
FIG. 4
FIG. 5
INVENTOR.
Alfred E. Traver
BY James Powers Jr
Attorney

METHOD AND APPARATUS FOR PHOTO-ELECTRICALLY MONITORING THE DEGRADATION OF AN OIL STREAM

BACKGROUND OF THE INVENTION

1. Field of the Invention

This invention relates to a method and an apparatus for monitoring a flowing stream. More particularly, it relates to a method and an apparatus for monitoring the degradation of a flowing oil stream.

2. Description of the Prior Art

It is known to measure the degradation of lubricating oils used, for example, in jet engines, automobile and railroad diesel crank cases by placing a few drops of oil in an oil test cell and displaying the percent light transmission through the test cell on an indicating meter. The percent of light transmission through the oil cell is indicative of the degradation of the oil as a result of, for example, oxidation and/or the accumulation of contaminates in the oil. This type of instrument requires that the oil cell be manually opened to place the oil therein, and that the cell be wiped clean after the measurement. Therefore, the prior art instrument was not capable of continuously monitoring a flowing oil stream.

SUMMARY OF THE INVENTION

The method and apparatus according to the present invention provides for continuously monitoring the degradation of a flowing oil stream. The invention provides for diverting a portion of a flowing oil stream to an oil chamber, and measuring the percent of light transmission through the diverted portion of the stream by causing an unbalance in a bridge circuit to thereby provide an indication of the degradation of the stream.

In accordance with the present invention, there is also provided a device for monitoring the degradation of an oil stream wherein a pair of serially connected photocells form two legs of a bridge circuit. One of the photocells senses the amount of light transmission through a diverted portion of the oil stream situated in an oil chamber and the other of the photocells located in close proximity to the first photocell compensates for changes in ambient temperature. The amount of light transmission through the diverted portion of the oil stream in the oil chamber is indicative of the degradation of the oil and is represented by causing an unbalance in the bridge circuit. The amount of unbalance of the bridge circuit may be displayed on a meter or recorded.

The present invention also provides for balancing the bridge circuit by utilizing a glass plate to displace substantially all the oil from the oil chamber. With the glass plate in line with the active photocell, the bridge is balanced. Since the glass plate may not displace all the oil from the oil chamber, the glass may be moved into the oil cell periodically during the monitoring process, and the amount of light passing through the thin film strips remaining on either side of the glass plate is recorded to provide a new base line from which subsequent recordings of the degradation of the oil may be measured.

BRIEF DESCRIPTION OF THE DRAWINGS

FIG. 2 is a view of the portion of the monitor according to the present invention which is inserted in an oil stream line;

FIG. 3 is a cross-sectional view of the portion of the monitor taken along lines III–III of FIG. 2;

FIG. 4 is another cross-sectional view of FIG. 2 taken along lines IV–IV; and

FIG. 5 is an illustrative graph showing recorded signals representative of the degradation of a monitored oil stream, and representative of a floating base line.

DESCRIPTION OF SPECIFIC EMBODIMENTS

Figure 1:
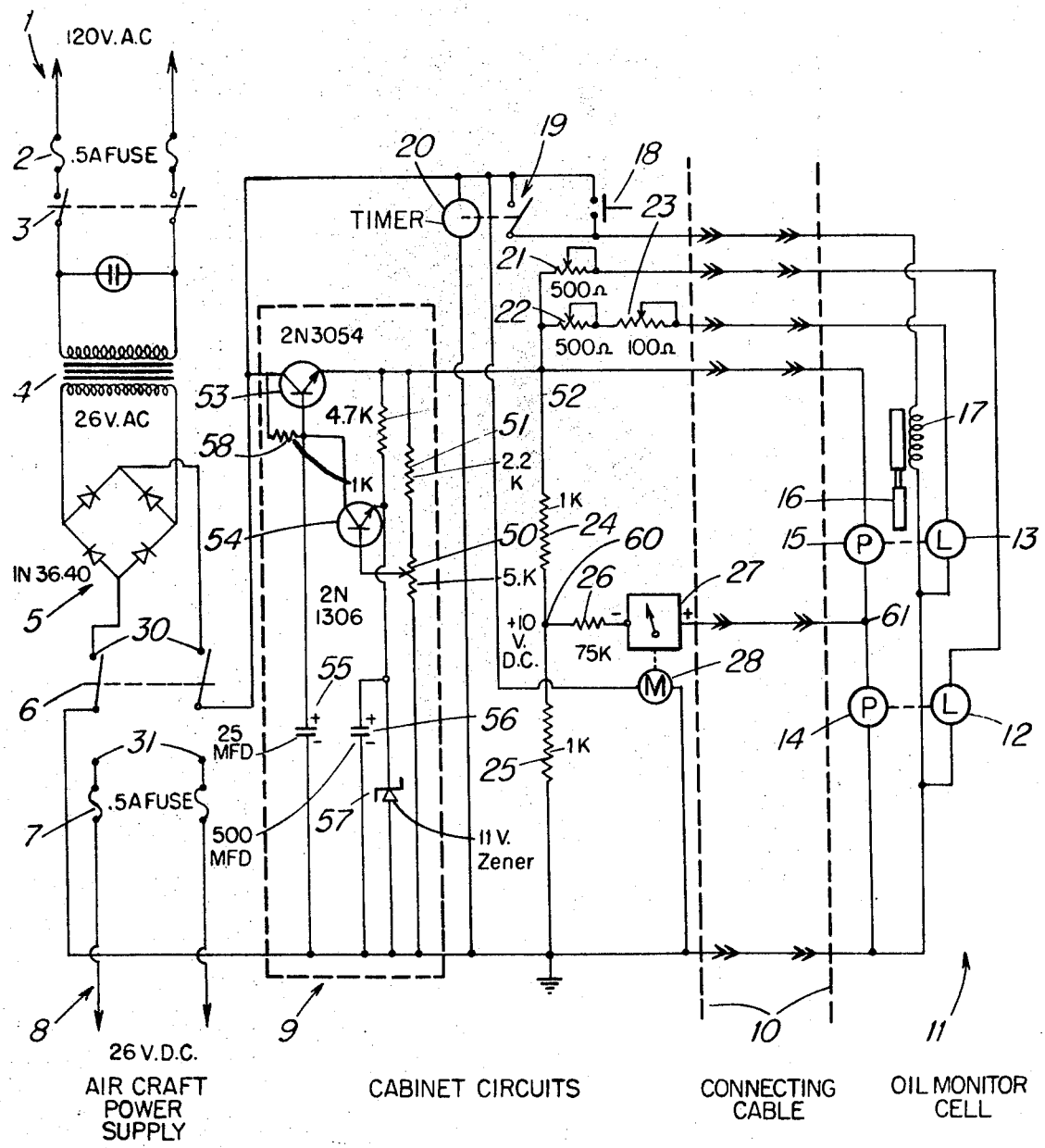
FIG. 1 is a schematic diagram of an illustrative circuit for providing a display which is representative of the degradation of a flowing stream.

An oil stream monitor according to the present invention is schematically shown in FIG. 1. The circuit of this embodiment provides a source of AC power 1, shown as 120 volts, which is applied to one pair of contacts 30 of a power selection switch 6 by way of a pair of fuses 2, a switch 3, a transformer 4 and a diode rectifier 5. The transformer 4 and the rectifier 5 act to convert the AC input to a 26-volt DC at the contact 30. The monitor of this embodiment may also receive a 26-volt DC input 8, for example an aircraft power supply, which is applied to the other pair of terminals 31 of the selection switch 6 by way of a pair of fuses 7. The unregulated DC voltage from either of the terminals 30, 31 of the selection switch 6 is applied to a cycle timer 20, the terminals of normally opened timer switch 19, the terminals of normally opened push button switch 18, a recorder motor 28, and a regulated power circuit indicated by the dashed rectangle 9. The voltage regulator circuit 9 may be a conventional circuit such as that shown in FIG. 10.1 of TRANSISTOR MANUAL, General Electric Company, 1964. Suitable components and component values are shown in FIG. 1.

The voltage regulator 9 applied a regulated 20 volts across a bridge circuit comprising a pair of serially connected resistors 24, 25 and a pair of serially connected photoelectric cells consisting of an active photoelectric cell 15 and a passive photoelectric cell 14. The regulated voltage from the voltage regulator 9 is also applied to a pair of parallelly connected lamp circuits one of which includes a lamp 12 for the passive photoelectric cell 14 and the other of which includes the lamp 13 for the active photoelectric cell 15. Each of the lamp circuits includes an adjustable resistor 21, 22 which drops the regulated 20-volt power to approximately 3.5 volts for application to the lamps 12, 13.

To calibrate the system the push button switch 18 is actuated to provide unregulated DC voltage to a solenoid 17 which in turn moves a glass plate 16 between the active photoelectric cell 15 and its corresponding lamp 13. With the glass plate between the active photoelectric cell 15 and its lamp 13 a variable rheostat 23 is adjusted if necessary to balance the bridge circuit such that there is a zero EMF between points 60, 61 of the bridge circuit.

A recorder 27 is provided to interconnect points 60, 61 of the bridge circuit to thereby sense any unbalance in the circuit and record any such unbalance. During operation, unregulated voltage is applied to the recorder motor 28 to continuously drive the recorder 27.

FIGS. 2 to 4 show an illustrative embodiment for diverting a portion of a flowing stream to an oil monitor chamber. For example, to monitor the lubricating oil provided to the bearings of a jet engine the oil line between the oil pump and the bearing is cut and the device of FIG. 2, shown in FIG. 1 as oil monitor cell 11, is inserted therein. As shown in FIG. 1, a connecting cable 10 interconnects the oil monitor cell and the aircraft cabinet circuits.

With reference to FIGS. 2 to 4, the oil monitor cell 11, comprises three metallic blocks 105, 106, 107 secured together by bolts 108 inserted through the lower two blocks 106, 107 and threaded in the internally threaded upper block 105. The upper block 105 is preferably made of iron or steel, and the lower blocks 106, 107 are preferably composed of aluminum. The lower block 107 has a conduit 109 formed therethrough to permit the passage of the monitored stream. The conduit 109 is internally threaded at the outer ends thereof to permit the stream line between the oil pump and the engine bearing to be secured to the lower block 107 such that the stream will flow through the block via the conduit 109.

A diverting conduit 110 is provided in the lower block 107 to permit the passage of a minor portion of a flowing stream upwardly to the middle block 106. The middle block 106 has an oil monitor chamber 111 formed therein to receive the diverted portion of the stream that passes through the diverting conduit 110. The oil monitor chamber 111 is provided with transparent material, such as glass, 120, 121 along two opposing walls. The transparent material 120, 121 is more clearly shown in FIGS. 3 and 4.

A pair of boreholes 112, 130 having the same axis are formed in the center block 106 between chamber walls having the transparent material 120,121 and the outer surfaces of the center block 106. The active photoelectric cell 15 is inserted in one of the boreholes 112, 130 and its corresponding lamp 13 is placed in the other of the boreholes 112,130 such that the active photoelectric cell 15 in in a position to monitor the amount of light emanating from its corresponding lamp 13 through the diverted portion of the stream in the oil monitor chamber 111.

The center block 106 also has another borehole 113 formed therethrough. The passive photoelectric cell 14 is inserted at one end of the additional borehole 113 and its corresponding lamp 12 is positioned at the other end of the borehole 113. By placing the passive photoelectric cell 14 in the immediate vicinity of the active photoelectric cell 15, the passive photoelectric cell 14 compensates the bridge circuit for changes in the ambient temperature. For example, when the monitor of the present invention is inserted in the lubricating oil lines of a jet engine, the temperature may be in the vicinity of 300° F.

The upper block 105 has a borehole 131 formed therethrough which is in fluid communication with the oil monitor chamber 111. A thinned wall sleeve 101 has one opened end which is secured by silver solder or brassing about the borehole 131. The sleeve is preferably made of brass. An iron armature 102 is biased to the upper part of the sleeve 101 by means of a spring 115. An extension arm 116 has one end thereof threaded into the lower part of the iron armature 102 and has a substantially rectangular transparent displacing device 114 secured to the other end thereof. This displacing device is shown in FIG. 1 as 16. The displacing device 114 is preferably made of glass and is secured to the extension arm 116 by means of an epoxy cement.

As shown in FIGS. 2 and 3 the displacing device 114 extends through the borehole 131 and, for a short distance, into the oil monitor chamber 111 when the armature 012 is biased to its upper position as shown in FIG. 4. The transparent displacing device 114 extends into the oil monitor chamber 111 in close proximity to the transparent windows 120,121 as shown in FIG. 4.

As shown in FIG. 2, a solenoid coil 103 is mounted on the upper block 105 about the sleeve 101. This solenoid corresponds to the solenoid 17 in FIG. 1. When power is applied to the solenoid coil 103, the iron armature 102 is pulled downwardly to move the transparent displacing device 114 into the oil monitor chamber 111 to thereby displace substantially all of the stream that is in the oil monitor chamber 111 back through the diverting conduit 110. When the transparent displacing device 114 is fully in the oil monitor chamber 111, only a very thin film of the oil being monitored will remain on either side of the displacing device 114 between the device and the windows 120,121. Thus, the active photoelectric cell 15 will sense substantially all the light emanating from its lamp 13.

As the monitored oil stream becomes more oxidized or otherwise contaminated, progressively less light passes through the chamber 111 to the active photoelectric cell 15. The decrease in light intensity sensed by the active photoelectric cell 15 causes an unbalance in the bridge circuit which unbalance is displayed on the recorder 27 as a representation of the degradation of the oil stream.

The bridge balance point will drift as the monitored oil becomes more degraded because the bridge circuit is initially balanced with the thin film strips of oil on both sides of the transparent displacing device 114. To compensate for bridge balance point drift, the transparent displacing device 114 is periodically inserted into the oil monitor chamber 111 and the recorder 27 displays a representation of the amount of light passing through the degraded film strips of oil and the transparent displacing device 114. These periodic recordings provide a floating base line from which subsequent recordings of the oil stream may be measured to provide an accurate indication of the degradation of the oil stream.

The circuit comprising the cycle timer 20 and the timer switch 21 of FIG. 1 is used to periodically insert the transparent displacing device 16 or 114 into the chamber 111. The cycle timer 20 may comprise a cam mounted on a shaft which periodically actuates the timer switch 19 to supply unregulated power to the solenoid 17 and thereby insert the displacing device 16 between the active photoelectric cell 15 and its lamp 13. The cycle timer 20 is preferably actuated for approximately 30 seconds to insure that the recorder 27 makes a visible recording. The recording of the amount of light transmission through transparent displacing device 16 and the film strips of oil on either side thereof provide a base line representative of the drift in the bridge balance.

FIG. 5 shows a representative recording made by the recorder 27. The relatively long upper lines represent the increasing degradation of the oil stream, and the relatively short lower lines are the bridge balance base lines formed by measuring the intensity of light received by the active photoelectric cell 15 when the transparent displacing device 16 or 114 is fully inserted into the oil monitoring chamber 111. Therefore, an accurate indication of degradation of the oil may be obtained by measuring the difference between the most recently recorded base line and the subsequently recorded indication of the degradation of the oil.

The present invention contemplates a bridge circuit wherein the bridge is automatically adjusted to compensate for bridge balance drift. Further, it is within the scope of the present invention to provide a return conduit between the oil monitoring chamber 111 and the monitored stream conduit 109 such that a diverted stream flows through the oil monitoring chamber 111.

The oil monitor cell 11 may be mounted beneath the cowling or housing of an aircraft or other engine between a lubricating oil pump and the engine bearings. Further, the photoelectric cells 14,15 and their respective lamps 12,13 may be at a location remote from the middle block 106 of FIG. 2, and in optical communication therewith by optical fibers to connect the photoelectric cells 14,15 and their respective lamps 12,13 to boreholes 113 and 112, and 130, respectively.

I claim:

1. In an apparatus for monitoring the degradation of an oil stream comprising, in combination:

an oil monitoring chamber having a pair of opposing transparent sides, conduit means for diverting a portion of the oil stream to said chamber, circuit means comprising an active photocell in optical communication with one of said transparent sides, a first source of light in optical communication with the other of said transparent sides opposite said one transparent side, wherein the improvement comprises, said circuit means being a bridge circuit having said active photocell in one leg thereof and a passive photocell in another leg thereof, said passive photocell being located in close proximity to said active photocell to compensate for changes in ambient temperature, a second source of light in optical communication with said passive photocell, means for displaying a bridge circuit unbalance signal generated by a diminution of the amount of light from said first source of light sensed by said active photocell, said bridge circuit unbalance signal being indicative of the degradation of the oil stream, transparent means for displacing substantially all the oil from said chamber, and means for periodically actuating said transparent oil displacing means into said chamber, whereby a reference signal is applied to said displaying means for display thereon.

2. In an apparatus for monitoring the degradation of an oil stream comprising, in combination:

an oil monitoring chamber having a pair of opposing transparent sides, conduit means for diverting a portion of the oil stream to said chamber, circuit means comprising an active photocell in optical communication with one of said transparent sides, a first source of light in optical communication with the other of said transparent sides opposite said one transparent side, wherein the improvement comprises, said circuit means being a bridge circuit having said active photocell in one leg thereof and a passive photocell in another leg thereof, said passive photocell being located in close proximity to said active photocell to compensate for changes in ambient temperature, a second source of light in optical communication with said passive photocell, means for displaying a bridge circuit unbalance signal generated by a diminution of the amount of light from said first source of light sensed by said active photocell, said bridge circuit unbalance signal being indicative of the degradation of the oil stream, transparent means for displacing substantially all the oil from said chamber, means for moving said transparent means into said chamber, and variable resistor means connected in series with said first source of light for balancing said bridge circuit when said transparent means displaces substantially all the oil from said chamber.